United States Patent

Sakurai

[11] 3,884,202
[45] May 20, 1975

[54] ENGINE INTAKE AND EXHAUST APPARATUS

[75] Inventor: Yoshitoshi Sakurai, Kawasaki, Japan

[73] Assignee: Honda Giken Kogyo Kabushiki Kaisha, Tokyo, Japan

[22] Filed: June 22, 1973

[21] Appl. No.: 372,658

[30] Foreign Application Priority Data
June 28, 1972  Japan................ 47-76218

[52] U.S. Cl............. 123/122 AB; 123/75 B; 165/52
[51] Int. Cl...................... F02b 19/10; F02b 19/16
[58] Field of Search........ 123/122 A, 32 SP:32 ST, 123/52 M, 122 AB, 122 AC, 75 B; 165/52

[56] References Cited
UNITED STATES PATENTS

| | | | |
|---|---|---|---|
| 1,289,868 | 12/1918 | Moreland | 165/52 |
| 1,313,639 | 8/1919 | Nelson | 165/52 |
| 1,670,550 | 5/1928 | Putnam | 123/122 A |
| 1,777,949 | 10/1930 | Whiteman | 165/52 |
| 2,232,413 | 2/1941 | Steskac | 123/122 A |
| 2,821,182 | 1/1958 | Kennedy | 123/122 A |
| 2,836,161 | 5/1958 | Primakoff | 123/122 A |
| 3,092,088 | 6/1963 | Goossak | 123/32 SP |
| 3,659,564 | 5/1972 | Suzuki | 123/32 SP |
| 3,741,180 | 6/1973 | Eichbaum | 123/122 A |

Primary Examiner—Charles J. Myhre
Assistant Examiner—Ronald B. Cox
Attorney, Agent, or Firm—Lyon & Lyon

[57] ABSTRACT

An internal combustion engine has a main and auxiliary combustion chamber, a main and auxiliary carburetor and a main and auxiliary intake pipe providing communication between the respective carburetors and the chambers. The chambers are connected by a torch nozzle and an exhaust pipe is positioned in communication with the main combustion chamber. The main and auxiliary intake pipes and the exhaust pipes are integrally formed and positioned on the same side of the engine. A casing disposed about the pipes aids in the heating of the air fuel mixture and provides protection to the intake and exhaust apparatus.

2 Claims, 2 Drawing Figures

ENGINE INTAKE AND EXHAUST APPARATUS

This invention relates to internal combustion engines of the type having a main combustion chamber and an auxiliary combustion chamber connected by a torch nozzle. A rich mixture delivered to the auxiliary chamber is ignited by a spark plug, and the resulting torch flame is projected through the torch nozzle to ignite a relatively lean mixture in the main combustion chamber.

An engine of this type is known as a three-valve engine since each cylinder is provided with one exhaust valve and two inlet valves. One of the inlet valves controls delivery of lean mixture to the main chamber and the other inlet valve controls delivery of rich mixture to the auxiliary chamber. Such an engine is subject to difficulties under cold start-up conditions and sometimes during normal operation because the fuel in the rich mixture delivered to the auxiliary chamber tends to condense on the walls of the auxiliary intake pipe, resulting in waste of fuel and poor combustion. During cold start-ups, the fuel of the rich mixture is cooled in the auxiliary combustion chamber and intake paths which typically results in the fuel being separated from the air fuel mixture and adhering to the walls of the intake pipe.

More particularly, this invention relates to a device for heating the intake mixture in a main and an auxiliary intake pipe by the heat from an exhaust pipe. It is provided that the main and auxiliary intake pipes are positioned along and formed integral with the exhaust pipe. The pipes all being positioned on the same side of the engine and being disposed in a casing to aid in the heating of the air fuel mixture and provide protection to the intake and exhaust apparatus. Such heating of the intake air fuel mixture advances the vaporization of fuel, and uniforms the distribution of mixture in a multicylinder engine, and further develops good combustion.

In view of the foregoing, it is an object of this invention to provide a simple constructional arrangement whereby complete combustion can be provided even at the time of cold engine starting.

It is a further object of this invention to reduce harmful ingredients in the exhaust by providing new engine intake and exhaust arrangements.

Briefly stated and according to one aspect of this invention, a main intake pipe, auxiliary intake pipe, and an exhaust pipe are positioned on the same side of an engine body. These pipes are integrally formed, and are surrounded by a casing. Other objects and advantages will appear hereinafter.

Figure 1:
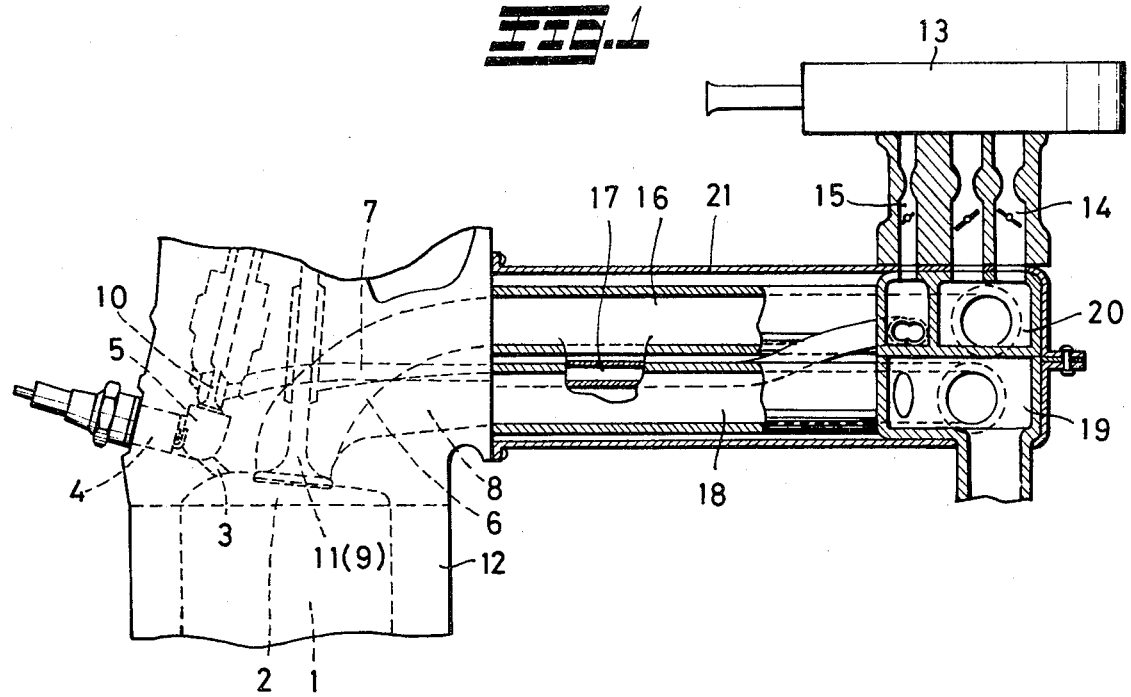
FIG. 1 is a sectional side view of an internal combustion engine equipped with the intake and exhaust apparatus of the present invention.
Figure 2:
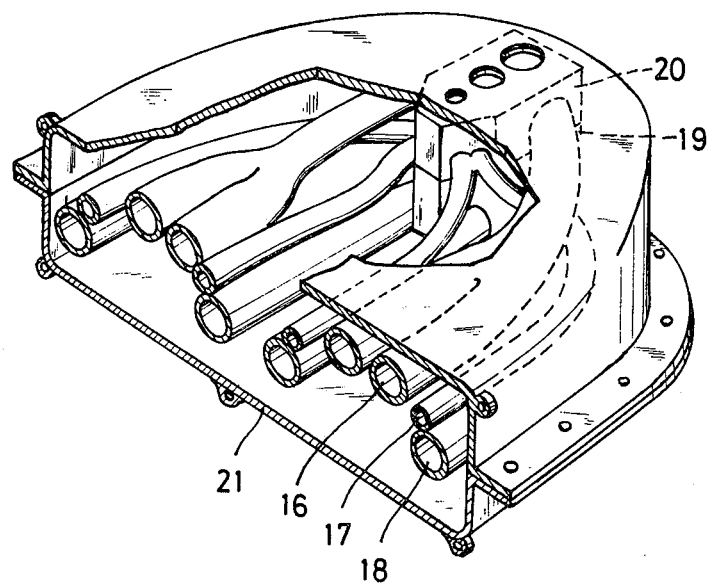
FIG. 2 is a perspective view of intake and exhaust apparatus in accordance with a preferred form of this invention.

Referring to the drawing, an engine body is generally designated by the number 12 includes an inner cylinder and an inner piston 1. The upper surface of the piston 1 forms one wall of a main combustion chamber 2. An auxiliary combustion chamber 5 is provided which includes an ignition or spark plug 4 communicated through a torch nozzle 3 with the main combustion chamber 2.

The spark plug 4 is provided to ignite the rich mixture in the auxiliary combustion chamber 5. This rich mixture is delivered through an auxiliary intake pipe 17 from an auxiliary carburetor 15. The two barrel carburetor 14 delivers lean mixture to the main intake pipe 16 and included an air cleaner 13 mounted thereon.

Thus, relatively rich mixture is ignited by the spark plug 4 within the auxiliary combustion chamber 5 to burn so that the flame thus produced is injected through the torch nozzle 3 into the main combustion chamber 2 thereby introducing burning explosion within the chamber 2.

Referring to FIG. 1, number 8 denotes an exhaust passage communicating with the main combustion chamber 2. A main intake valve 9 and an exhaust valve 11 are positioned in communication with the main combustion chamber. An auxiliary intake valve 10 is positioned in communication with the auxiliary combustion chamber 5.

A main intake pipe 16 is provided in communication between the main combustion chamber 2 and the main carburetor 14. An auxiliary intake pipe 17 is provided in communication between the auxiliary combustion chamber 5 and the auxiliary carburetor 15. The exhaust pipe 18 is provided to be in communication with the main combustion chamber 2. An exhaust manifold 19 is illustrated to be in thermal communication with a riser device 20.

When the engine is started from its cold condition, the rich mixture for ignition is typically cooled in the auxiliary intake passage 7 as well as in the auxiliary combustion chamber 5, to result in a separation of the fuel from the air fuel mixture. The fuel then adheres to the wall surfaces which causes poor fuel economy; also, hydrocarbons are liable to be exhausted, and thus become a cause for air contamination.

According to this invention, as described above, the auxiliary intake pipe 17 is formed to be integral with and adjacent to the exhaust pipe 18, so that simultaneously with starting of the engine, the auxiliary intake pipe 17 is heated by the intensive heat of the exhaust. The rich mixture flowing in the auxiliary intake pipe 17 is quickly heated to be fully vaporized.

Additionally, the periphery of the intake and exhaust pipes 16, 17 and 18 is covered with a covering or casing 21, so that a resulting air layer is formed. The auxiliary intake pipe 17 and the exhaust pipe 18 are kept warm by the air layer and at the same time, through the air layer, the lean mixture in the main intake pipe 16 is heated to such an extent that the mixing ratio thereof is not affected adversely and its vaporized condition is well maintained. The foregoing casing 21 has a thermally insulating effect and also serves as a protective device for the intake and exhaust pipes 16, 17 and 18.

Having described the invention, it is to be understood that the invention is not to be limited to the details herein set forth, but that the invention is of the full scope of the appended claims.

What is claimed as new and desire to be secured by letters patent of the U.S. is:

1. In an internal combustion engine having a main and an auxiliary combustion chamber communicating through a torch nozzle, the improvement comprising, in combination: a main and an auxiliary carburetor means, a riser device communicating with the main and auxiliary carburetor means, an intake passage means connecting the riser device with the main combustion chamber, an auxiliary intake passage means connecting the riser device and the auxiliary combustion chamber, an exhaust passage means connecting the main combustion chamber with the riser device, the auxiliary intake passage means being formed integrally with the exhaust passage means, a casing disposed about the main intake passage means, the auxiliary intake passage means, the exhaust passage means and the riser device, said casing extending from around the riser device to the engine.

2. The apparatus as in claim 1 wherein the main intake, auxiliary intake and exhaust passage means are integrally formed.

* * * * *